United States Patent

[11] 3,608,077

[72] Inventor Robert Ginsig
    Mexico City, Mexico
[21] Appl. No. 876,592
[22] Filed Nov. 13, 1969
[45] Patented Sept. 21, 1971
[73] Assignee Syntex Corporation Panama Republic of Panama

[54] STABILIZATION OF METAL STEROID ALCOHOL SULFATES
    13 Claims, No Drawings

[52] U.S. Cl. ........................................................ 424/243
[51] Int. Cl. ....................................................... A61k 27/00
[50] Field of Search ......................................... 424/243

Primary Examiner—Richard L. Huff
Attorneys—Evelyn K. Merker, Lawrence S. Squires and Gerard A. Blaufarb ABSTRACT: A stabilized synthetic alkali metal estrogen sulfate mixture containing one or more synthetic alkali metal estrogen sulfates and urea. The mixture increases the stability of the estrogen sulfate component thereby increasing shelf life and pharmaceutical usefulness.

STABILIZATION OF METAL STEROID ALCOHOL SULFATES

BACKGROUND OF THE INVENTION

1. Field of the Invention

This invention relates to a stabilized synthetic alkali metal estrogen sulfate composition comprising at least one alkali metal estrogen sulfate and urea. In one aspect, the invention relates to a stabilized alkali metal estrogen 3-monosulfate and urea mixture. In another aspect the invention relates to a composition comprising sodium estrone sulfate and/or sodium equilin sulfate and/or sodium equilenin sulfate mixed with a urea substrate. In a still further aspect the invention relates to processes of preparing the above mixtures.

2. The Prior Art

As it is well known, the alkali metal sulfate salts of estrogens, such as for example estrone, estradiol, estriol, equilin, equilenin, and/or derivatives thereof, have extensive utility in the therapeutic treatment of various hormonal related disorders, especially those connected with menstruational and menopause disorders. The estrogen sulfates can be isolated from natural material and can also be prepared synthetically. For example, the sodium salt of estrone sulfate, which is one of the more efficacious forms for pharmaceutical uses, is commercially obtained from the extract of the urine of pregnant mares, and can also be prepared synthetically by the sulfonation of estrone followed by reaction with a suitable sodium salt (note U.S. Pat. No. 2,666,066). The synthetic preparation of estrogen sulfates is particularly desirable in that it affords better product control and further eliminates the unpleasant odor inherent to the naturally derived estrogen sulfate products. Unfortunately, it has been found that synthetically prepared alkali metal estrogen sulfates are unstable and will deteriorate upon prolonged exposure to the atmosphere thereby vitiating or diminishing their estrogenic properties and, correspondingly, their pharmaceutical usefulness. This deterioration is particularly acute and is apparently caused by atmospheric water and/or water, which is contained as an impurity within the estrogen sulfate composition or within excipient materials used in the commercial pharmaceutical form of the composition. This water is believed to hydrolyze the alkali metal estrogen sulfate, resulting in the formation of the corresponding estrogen alcohol and alkali metal bisulfates.

This instability problem is well recognized, and the prior art has attempted many methods of overcoming this problem; some of which being more useful than others. The prior art has, for example, reacted synthetic alkali metal estrone sulfates with various organic materials to produce organic salts having increased stability. This approach is not entirely satisfactory in that it requires additional reaction steps and has further frequently resulted in salts, which, while having increased stability, lack sufficient water solubility to permit oral administration thus placing a severe limitation upon pharmaceutical applications of that form of estrogen sulfate. Note for example, U.S. Pat. Nos. 2,555,579; 2,581,350; and 2,650,918. Another approach used by the prior art is to compound the estrogen sulfate with another material (note U.S. Pat. No. 3,024,257 which uses N-methylglucamine and Canadian Pat. No. 691,988 which mixes synthetic sodium estrone sulfate with an estrogenic extract of pregnant mares' urine) resulting in a physical mixture of increased stability. This approach is more satisfactory in that it eliminates the necessity for additional reaction steps but is still dependent upon the use of a stabilizing material which will have the desired stabilizing effect. In accordance with this latter approach, I have discovered, that by the use of urea, I am able to obtain an alkali metal estrogen sulfate composition of exceptionally superior stability in which the estrogen sulfates retain their desirable water solubility.

My invention thus further affords the advantages of simplicity of manufacture in requiring only simple physical mixing or compounding procedures and use of a readily available and relatively inexpensive stabilizing material.

SUMMARY

In summary, the composition of my invention comprises at least one synthetic alkali metal estrogen sulfate in mixture with a urea substrate. I have further found that the urea substrate is particularly advantageous in stabilizing the alkali metal sulfate salts of estrone, equilin, and equilenin. Typically the composition will have a weight ratio of about from 0.1 to 200 grams of urea per gram of alkali metal estrogen sulfate. Especially good results are obtained by using an urea to estrogen sulfate weight ratio of about from 0.5 to 100 and best results are obtained using a weight ratio of 0.5 to 20. The composition of my invention can also be mixed with nontoxic diluents or excipients; and then compounded and/or pilled in the form of tablets, capsules, powder or prepared as a solution or other forms suitable for oral ingestions, as well as tablets, capsules, powders in the form of depositories for insertion into body cavities or in the form of sterile solutions for parental use.

The compositions of my invention can be prepared by physically mixing the components in a dry form, such as, for example, by trituration. Alternatively, the composition can be prepared by dissolving the urea and estrogen sulfate components in a suitable volatile solvent and then evaporating the solvent, thereby yielding an intimate mixture of urea and alkali estrogen sulfate or preferably the mixture can be prepared by precipitation of a solution or solutions of the estrogen sulfate component and urea component. Preferably, the solvent should be a nonaqueous solvent since the retention of water, such as for example, occluded water or water of hydration, is undesirable.

DETAILED DESCRIPTION OF THE INVENTION AND PREFERRED EMBODIMENTS

Considering now the composition of my invention in greater detail, this composition comprises a synthetic alkali metal estrogen sulfate in mixture with urea or a urea derivative, in a weight ratio in the range of about from 0.1 to 200 parts of urea or urea derivative per part of alkali metal estrogen sulfate. I have further found that particularly good results are obtained using weight ratios in the range of about from 0.5 to 100 parts of urea per part of estrogen sulfate and best results are obtained using weight ratios in the range of about from 0.5 to 20 parts of urea per part of estrogen sulfate. Where a urea derivative is used, the weight of the derivative, for the purposes of the aforementioned weight ratios, should be calculated based on the urea content of the derivative. Suitable urea derivatives include, for example, those compounds having the formulas:

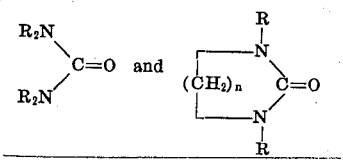

wherein R is H, $C_nH_{2n+1}$, or

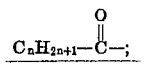

and $n$ can be 2, 3, or 4. However, in view of the exceptionally good results obtained with urea and its commercial availability, urea will be typically used, rather than a urea derivative. The alkali metal estrogen sulfates, which are stabilized according to my invention, include, for example, the alkali metal sulfate of estrone, equilin, equilenin and their 17-alcohol derivatives. My invention is further particularly useful in stabilizing those synthetic estrogen sulfates which are known to have very poor stability, such as the synthetically prepared alkali metal sulfate salts of estrone, equilin and equilenin, and especially the synthetically prepared forms of sodium estrone sulfate, sodium equilin sulfate, sodium equilenin sulfate, and the like.

One process for preparing my composition comprises first providing the particular alkali metal estrogen sulfate, which it is desired to stabilize. The method of preparing the estrogen sulfate is not a part of my invention, and suitable methods of preparing such materials are known to the art. Note, for example, U.S. Pat. No. 2,917,522 which teaches the preparation of alkali metal estrone sulfate salts; and U.S. Pat. No. 2,636,042 which teaches the preparation of sodium sulfate salts of estrone, equilin, and equilenin. Further information relating to estrogens and the preparation of estrogen sulfates can be obtained by reference to general text materials such as, for example, Fieser and Fieser, Steroids, Reinhold (1959), pages 444 to 502; W. Klyne, The Chemistry of the Steroids, John Wiley & Sons, Inc. (1965), pages 101 to 102. The desired alkali metal estrogen sulfate in dried powder form is then mixed with urea, preferably anhydrous powdered urea, in relative quantities so as to provide a final mixture composition having a weight ratio of alkali metal estrogen sulfate to urea or urea derivatives, within the weight ratio ranges set forth above. The materials can, for example, be desirably mixed together by the use of trituration, i.e., the combined mixing and grinding of the components. Suitable excipients can also be mixed with the estrogen sulfate and urea components during this mixing step or can be subsequently added to the mixture. Suitable excipient materials include, for example, sodium bicarbonate, magnesium stearate, starch, mannitol, lactose, calcium carbonate, sodium bicarbonate, metal phosphates, potassium bicarbonate, talc, gums, and the like. The primary requirements of the excipient materials being that they are nontoxic, water soluble, and desirably will, upon hydrolysis, form neutral or alkaline or only very mildly acidic products. This last requirement is desirable since it is conjectured that the deterioration of the estrogen sulfate component is largely produced by hydrolyzation of the estrogen sulfate to the corresponding estrogen alcohol and alkali metal bisulfate salt. This reaction is an expotential function of the hydrogen ion concentration; and thus would be promoted by the use of excipients which provide acidic components upon hydrolysis with either occluded or atmospheric moisture. I have further discovered that although the sodium form of these estrogen sulfates is the most common or prevalent form of these estrogens that the potassium form is more stable. Thus in a particularly preferred form, the estrogen sulfate is a potassium estrogen sulfate.

The final composition, including desired excipients, can then be compounded or pilled into the desired physical form, e.g. pill, tablet, capsule, solution, etc. Tablet formulations comprising starch, lactose, and trisaccharide in combination with at least one alkali metal estrogen sulfate and urea and also formulations comprising sodium bicarbonate and/or potassium bicarbonate in combination with at least one alkali metal estrogen sulfate and urea, are particularly desirable both with respect to stability and ease of manufacture and availability of the excipient materials..

In a further aspect the composition of my invention can be prepared by dissolving both the alkali metal estrogen sulfate component or components and the urea or urea derivative components in a suitable solvent and then evaporating the solvent to dryness or precipitating the components in a liquid in which the components are insoluble to yield an intimate mixture of the estrogen sulfate component and urea component. The quantity of solvent required will obviously vary with the particular solubility of the estrogen sulfate and urea component within that solvent, and desirably a high concentration of the estrogen sulfate and urea components should be used to prevent the necessity for excessive evaporation of the solvent. The determination of the optimum solvent and concentration for a given estrogen sulfate-urea system is well within the scope of one having ordinary skill in the art. Preferably, the solvent should be anhydrous to prevent the possible occlusion of water within the composition after evaporation of the solvent. Suitable solvents include, for example, methanol, ethanol, glycol, benzyl alcohol and the like. The composition can then be compounded and/or pilled, and additional excipients added, if desired, in the same manner as described above.

In a preferred embodiment of this aspect of my invention, I prepare the composition of my invention by dissolving the desired relative quantities of urea and alkali metal estrogen sulfate in methanol and then precipitating the urea and alkali metal estrogen by slowly adding this solution to ethyl ether. The precipitate is then recovered by any suitable liquid-solid separation means (conveniently filtration) and dried. This method of preparation is particularly desirable since it yields an intimate mixture of urea and estrogen sulfate which can be easily recovered from the liquid phase by filtration. The optimum concentrations of methanol and ether and operating conditions for a given estrogen sulfate-urea system can be determined by conventional experimental techniques well within the scope of one having ordinary skill in the art.

As is well known to the art, the estrogen sulfates have particular utility in treatment of various hormonal disorders or hormonal related disorders such as, for example, those related to menstruation abnormalities and menopause syndrome, and particular applications and dosages of such estrogen sulfates can be obtained by reference to the Physician's Desk Reference (1967), under the heading "Estrogens Conjugated (Equine)."

A further understanding of my invention can be had from the following illustrative examples. Also, unless expressly stated to the contrary, the alkali metal estrogen sulfates referred to in the examples, and herein above, are synthetically prepared alkali metal estrogen sulfates.

EXAMPLE 1

This example illustrates a dry mixing method of preparing compositions of my invention, having an alkali metal estrogen sulfate to urea weight ratio of 1:1.

In this example, 1 g. of a synthetically prepared sodium estrone 3-monosulfate is added to 1 g. of urea and then thoroughly mixed in a homogenizer to yield an intimate mixture of the estrone sulfate and urea components having a weight ratio of 1:1.

One to one weight ratio mixtures of sodium equilin 3-monosulfate and urea and sodium equilenin 3-monosulfate and urea are prepared in the same manner.

The above mixtures are then tested for stability by exposure to the atmosphere at room temperature (i.e. about 20° C.). In each case the mixture is found to have a stability in excess of 9 months. In contrast to this, a pure sample of synthetically prepared sodium estrone sulfate, identical to that used in the above mixture, is found to have a stability, under the same conditions, of only six days. The respective pure synthetic sodium equilin sulfate and sodium equilenin sulfate have stabilities on the same order as that of the pure synthetic sodium estrone sulfate sample.

EXAMPLE 2

In this example, sodium estrone 3-monosulfate & urea, sodium equilin 3-monosulfate & urea, and sodium equilenin 3-monosulfate & urea mixtures having weight ratios of the estrogen component to urea of 1:0.2 are prepared in the same manner as the mixtures prepared in Example 1. The respective samples are then tested for stability by exposure to air at room temperatures (i.e. about 20° C.) and are found in each case to have stabilities in excess of 60 days.

EXAMPLE 3

In this example, sodium estrone 3-monosulfate & urea, sodium equilin 3-monosulfate & urea, and sodium equilenin 3-monosulfate & urea mixtures having weight ratios of the estrogen component to urea of 1:2 are prepared in the same manner as the mixtures prepared in Example 1. The respective samples are then tested for stability by exposure to air at room temperatures (i.e. about 20° C.) and are found, in each case, to have stabilities in excess of 6 months.

EXAMPLE 4

In this example sodium estrone 3-monosulfate & urea, sodium equilin 3-monosulfate & urea, and sodium equilenin 3-monosulfate & urea mixtures having weight ratios of the estrogen component to urea of 1:9 are prepared in the same manner as the mixtures prepared in Example 1. The respective samples are then tested for stability by exposure to air at room temperatures (i.e. about 20° C.) and are found, in each case to have stabilities in excess of 6 months.

EXAMPLE 5

This example illustrates the stability of estrogen sulfate mixtures containing the conventional excipient tricalcium phosphate and one of the following: sodium estrone 3-monosulfate; sodium equilin 3-monosulfate; and sodium equilenin 3-monosulfate. In this example the mixtures are prepared in the same manner as in example 1 by respectively mixing 1 gram of the aforementioned estrogen sulfates with 20 grams of tricalcium phosphate.

The respective mixtures are then tested for stability by exposure to air at room temperature (i.e. about 20° C.) and are found to have stabilities of less than 14 days.

EXAMPLE 6

In this example three component mixtures, containing a sodium estrogen 3-monosulfate, urea and the conventional excipient tricalcium phosphate, having a respective weight ratio of 1:1:20, are prepared by mixing one gram of the sodium estrogen sulfate with 1 g. of urea and 20 g. of tricalcium phosphate in a homogenizer. The sodium estrogen sulfates are sodium estrone 3-monosulfate, sodium equilin 3-monosulfate and sodium equilenin 3monosulfate. The resulting mixtures are then tested for stability in the same manner as in the above examples. In each case the mixture is found to have a stability in excess of 6 months.

EXAMPLE 7

In this example an accelerated stability test is run on compositions prepared in accordance with examples 1, 2, 3, 4, and 6 by exposing the respective compositions to a controlled atmosphere maintained at a temperature of 60° C. and a relatively humidity of 60 percent. The results of this test are summarized in the following table.

TABLE I

| Sodium Estrogen Sulfate | Estrogen Sulfate to Urea Wt. Ratio | Stability |
|---|---|---|
| Estrone | 1:1 | >2 months |
| Equilin | 1:1 | >2 months |
| Equilenin | 1:1 | >2 months |
| Estrone | 1:.2 | >1 month |
| Equilin | 1:.2 tl >1 month | |
| Equilenin | 1:.2 | >1 month |
| Estrone | 1:2 | >2 months |
| Equilin | 1:2 | >2 months |
| Equilenin | 1:2 >2 months | |
| Estrone | 1:9 | >2 months |
| Equilin | 1:9 | >2 months |
| Equilenin | 1:9 | >2 months |
| Estrone | 1:1:20 | >1 month |
| Equilin | 1:1:20 | >1 month |
| Equilenin | 1:1:20 | >1 month |

From the above table it can be seen that even under accelerated testing conditions the urea-estrogen sulfate mixtures have stabilities greater than one month.

EXAMPLE 8

This example illustrates a solvent-precipitation method of preparing a composition of my invention.

In this example, 10 g. of sodium estrogen sulfate and 90 g. of urea are dissolved in 100 ml. of methanol at 25° C. The resulting solution is then slowly added to 1,000 ml. of ethyl ether at 25° C. The resulting urea-estrogen sulfate intimate precipitate is then filtered and dried by conventional means. The resulting sodium estrogen sulfate urea residue is then tested for stability by exposure to the atmosphere at 20° C. The precipitate is found to have a stability in excess of 12 months.

EXAMPLE 9

In this example, potassium estrone 3-monosulfate & urea; potassium equilin 3-monosulfate & urea; and potassium equilenin monosulfate & urea mixtures having weight ratios of the estrogen component to the urea component of 1:2 are prepared in the same manner as the mixtures of example 1. The respective samples are then tested for stability by exposure to air at room temperature (i.e. about 20° C.) and are found in each case to have stabilities in excess of 12 months.

From the above examples it can be readily seen that the mixtures of my invention possess stabilities greatly in excess of the corresponding pure alkali metal estrogen sulfates and alkali metal estrogen-tricalcium phosphate excipient mixtures, and that the urea-tricalcium phosphate alkali metal compositions of my invention possess greater stabilities than the corresponding alkali metal estrogen-tricalcium phosphate mixtures. The stabilized tricalcium phosphate mixture is of particular interest as tricalcium phosphate is a frequent commercial carrier material (substrate) for estrogen sulfates.

Obviously many modifications and variations of the invention, described hereinabove and in the appended claims, can be made without departing from the essence of the scope thereof.

1. A stabilized synthetic alkali metal estrogen sulfate composition consisting essentially of an intimate mixture of at least one synthetic alkali metal estrogen sulfate and urea having a weight ratio of urea to estrogen sulfate of about from 0.1 to 200 parts of urea per part of said estrogen sulfate.

2. The composition of claim 1 wherein the weight ratio of urea to estrogen sulfate is in the range of about from 0.5 to 100 parts of urea per part of estrogen sulfate.

3. The composition of claim 1 wherein the weight ratio of urea to estrogen sulfate is in the range of about from 0.5 to 20 parts of urea per part of estrogen sulfate.

4. The composition of claim 1 wherein said alkali metal estrogen sulfate is selected from the group consisting of the alkali metal sulfates of estrone, equilin, equilenin, and mixtures thereof.

5. The composition of claim 1 wherein said alkali metal estrogen sulfate is a sodium estrogen sulfate.

6. The composition of claim 1 wherein said alkali metal estrogen sulfate is selected from the group of consisting of sodium estrone 3-monosulfate, sodium equilin 3-monosulfate, sodium equilenin 3-monosulfate and mixtures thereof.

7. The composition of claim 6 wherein said alkali metal estrogen sulfate is sodium estrone 3-monosulfate.

8. The composition of claim 1 wherein said alkali metal estrogen sulfate is a potassium estrogen sulfate.

9. The composition of claim 1 wherein said alkali metal estrogen sulfate is selected from the group consisting of potassium estrone 3-monosulfate, potassium equilin 3-monosulfate, potassium equilenin 3-monosulfate and mixtures thereof.

10. A stabilized estrogen sulfate carrier mixture consisting essentially of the composition of claim 1 and tricalcium phosphate.

11. A stabilized alkali metal estrogen sulfate tablet composition consisting essentially the composition of claim 1 in intimate mixture with excipients selected from the group consisting of sodium bicarbonate, potassium bicarbonate and mixtures thereof.

12. A stabilized alkali metal estrogen sulfate tablet composition consisting essentially of the composition of claim 1 in mixture with starch, lactose and trisaccharide.

13. A method of preparing the composition of claim 1 which comprises:
   a. dissolving urea and at least one alkali metal estrogen sulfate in methanol,
   b. slowly adding the solution of a step a. to ethyl ether thereby precipitating an intimate mixture of urea and alkali metal estrogen sulfate and,
   c. recovering and drying said intimate mixture.